United States Patent
Brauch et al.

(10) Patent No.: US 6,526,572 B1
(45) Date of Patent: Feb. 25, 2003

(54) MECHANISM FOR SOFTWARE REGISTER RENAMING AND LOAD SPECULATION IN AN OPTIMIZER

(75) Inventors: Rupert Brauch, San Jose, CA (US); David A. Dunn, San Jose, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/500,518

(22) Filed: Feb. 9, 2000

(51) Int. Cl.⁷ .................................................. G06I 9/45
(52) U.S. Cl. .................. 717/154; 717/131; 717/152; 717/153; 712/226; 712/227
(58) Field of Search ................................ 717/9, 5, 7, 4, 717/127–130, 151–154; 712/226, 227, 239, 221

(56) References Cited

U.S. PATENT DOCUMENTS

| | | | | |
|---|---|---|---|---|
| 5,787,287 A | * | 7/1998 | Bharadwaj ...................... | 717/8 |
| 5,933,635 A | * | 8/1999 | Holzle et al. ............... | 717/151 |
| 6,070,009 A | * | 5/2000 | Dean et al. ..................... | 717/4 |
| 6,128,775 A | * | 10/2000 | Chow et al. .................... | 717/9 |
| 6,158,049 A | * | 12/2000 | Goodwin et al. ............ | 717/158 |
| 6,223,340 B1 | * | 4/2001 | Detlefs .......................... | 717/9 |

OTHER PUBLICATIONS

Debugging optimized code with Dynamic Deoptimization,© 1992, p. 32–43 ACM.*

Patterson, David A. and John L. Hennessy, "Computer Architecture A Quantitative Approach", Second Edition, 1996, Morgan Kaufmann Publishers, Inc. Enclosed are copies of the cover, table of contents, index and the entire Chapter 4, which appears to be the most relevant chapter. However, Applicant will produce any portion of the book requested by Examiner).

* cited by examiner

*Primary Examiner*—Tuan Q. Dam
*Assistant Examiner*—Chuck Kendall

(57) ABSTRACT

The inventive mechanism operates to optimize program efficiency in a two phase process. In the first phase, the mechanism conducts a dependency analysis on the instructions to determine dependency relationships between the various instructions in an instruction window. The mechanism thereby identifies candidates for register renaming and instruction speculation, and provisionally performs the renaming and speculation operations, while preserving information which is preferably used to reverse these operations in the second phase if it is determined that the operations may be effectively rescheduled. In the second phase, the mechanism determines whether the optimizing operations, renaming and speculation, were beneficial in each case. Each instruction for which the mechanism finds the optimizing operation to be beneficial will generally remain in optimized form. Optimizing operations found not be beneficial are generally reversed by the mechanism. The mechanism thus selectively uses renaming and speculation operations so as to ensure that the benefits preferably outweigh the costs of the operation in each case.

20 Claims, 3 Drawing Sheets

NODE A: UPWARDS PATH LENGTH 0, SINCE IT IS A ROOT
DOWNWARDS PATH LENGTH 4
NODE B: UPWARDS PATH LENGTH 1
DOWNWARDS PATH LENGTH 3
NODE C: UPWARDS PATH LENGTH 3
DOWNWARDS PATH LENGTH 1
NODE D: UPWARDS PATH LENGTH 0
DOWNWARDS PATH LENGTH 1
NODE E: UPWARDS PATH LENGTH 4
DOWNWARDS PATH LENGTH 0

NODE A: UPWARDS PATH LENGTH 0, SINCE IT IS A ROOT
DOWNWARDS PATH LENGTH 4
NODE B: UPWARDS PATH LENGTH 1
DOWNWARDS PATH LENGTH 3
NODE C: UPWARDS PATH LENGTH 3
DOWNWARDS PATH LENGTH 1
NODE D: UPWARDS PATH LENGTH 0
DOWNWARDS PATH LENGTH 1
NODE E: UPWARDS PATH LENGTH 4
DOWNWARDS PATH LENGTH 0

MECHANISM FOR SOFTWARE REGISTER RENAMING AND LOAD SPECULATION IN AN OPTIMIZER

BACKGROUND OF THE INVENTION

One technique commonly used in program optimization is register renaming, which reduces false dependencies among the instructions, and gives an optimizer greater freedom to reorder instructions. This technique is especially useful in binary translators, emulators, and just-in-time compilers, which preferably preserve the register state at the exit of each basic block. Since register renaming generally requires the translator to insert additional instructions into the code, which copies the renamed register back to its original location, it is preferable to only rename registers when it will improve the performance of the code. Therefore, it is a problem in the art that it is not known when the benefits of renaming registers outweigh the cost.

Another technique sometimes used by optimizers is load speculation. Load speculation involves reordering program instructions which load information from memory. There are two forms of load speculation. If a load instruction is reordered so as to precede a branch, it is possible for the load instruction to execute even though the instruction would not even have been executed in the original program. This form of speculation is called "control speculation," since it is speculating that the branch will not cause the execution path to change.

A second form of speculation is "data speculation." In this situation, a load instruction is reordered so as to precede a store instruction, which may access the same memory location. For the speculation to be effective, it is preferable to determine whether the store instruction actually accesses the same memory location as the load instruction.

Some processors provide hardware support for control and data speculation. Using this approach, the optimizer splits the load instruction into two instructions. The first instruction, called a speculative load, performs the load without generating a trap. The second instruction checks to see whether the speculative load was successful, and takes some sort of corrective action if it was not. Load speculation allows the optimizer greater freedom to reorder instructions. However, since the optimizer generally inserts instructions at the original places to check for success of the speculation, there is a computational cost to this operation. Load speculation should therefore only be performed when the benefits of doing so outweigh the costs. It is a problem in the art that it is not known when it would be beneficial to speculate load instructions.

Therefore, there is a need in the art for a mechanism for determining when speculating load instructions would be computationally beneficial.

There is a further need in the art for a mechanism which will rename registers only when program efficiency will be enhanced by doing so.

There is a still further need in the art for a mechanism which will speculate load instructions only when program efficiency will be enhanced by doing so.

SUMMARY OF THE INVENTION

These and other objects, features and technical advantages are achieved by a mechanism which selects candidates for register renaming and instruction speculating, and then proceeds to rename the selected registers and to speculate selected instructions so as to optimize program performance.

In a preferred embodiment, at any given time, the mechanism's analysis is restricted to a set of instructions called the instruction window. The mechanism preferably has two distinct phases of operation each involving two optimizing operations: register renaming and instruction speculation.

In phase one, the Dependency Analysis Phase, the mechanism preferably decides which registers are candidates for renaming, and which instructions are candidates for speculation (re-ordering). The selection of candidates is preferably accomplished by analyzing the dependency of each instruction with respect to other instructions. The mechanism then preferably constructs a dependency graph from the dependency information gathered on the individual instructions.

In a preferred embodiment, when an optimizing operation may be beneficial for a particular instruction, the mechanism provisionally performs the operation, but preserves information about the state of the program prior to said operation. Preferably, the information so preserved may be used to reverse the operation if the mechanism later determines that the operation was not actually beneficial to program performance. An operation may be beneficial if the target of the instruction is located later in the instruction window than the instruction itself, and the optimizing operation permits the mechanism to move the instruction to an earlier point in the instruction stream.

In phase two, the Instruction Scheduling Phase, the mechanism preferably first determines whether the individual optimizing operations provisionally performed in Phase one were actually beneficial to program performance. Generally, an optimizing operation is actually beneficial if the mechanism cannot reschedule the original instruction in unoptimized form later in the instruction stream without lengthening the critical path of program execution in the instruction window.

Generally, if the operation is found to be actually beneficial, the optimized instruction concerned will preferably remain in optimized form and be executed. If the operation is found not to be actually beneficial, the mechanism preferably reverses the optimizing operation using the information about the state of the program prior to the operation which was preserved by the mechanism in phase one.

Generally, scheduling means placing instructions into templates to enable execution of the instructions with an minimum number of cycles without violating any data dependencies. Generally, speculation may violate data dependencies, but whether any data dependencies are actually violated is generally not known until run-time. Generally, hardware functionality will support a check operation to recover from any dependency violations.

Therefore, it is a technical advantage of a preferred embodiment of the invention that register renaming operations are performed only when doing so actually improves program performance.

It is a further technical advantage of a preferred embodiment of the present invention that instructions are speculated only when doing so actually improves program performance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

The text, "Computer Architecture: A Quantitative Approach" ($2^{nd}$ edition, 1996, January, 1996, Morgan Kaufmann Publishers), by John Hennessey et al, provides background information on speculation and register renaming and is hereby incorporated by reference.

Figure 1:
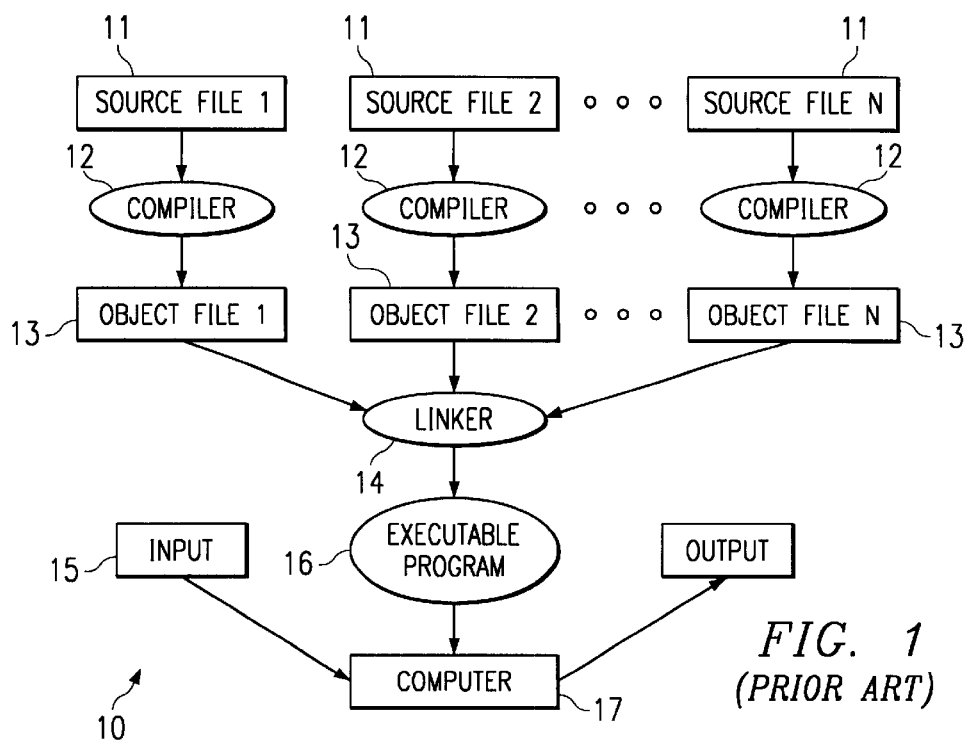
FIG. 1 depicts a general arrangement of a prior art compilation environment.

FIG. 1 illustrates the general structure of a typical compilation environment 10 wherein there are multiple source files 11 that comprise a program implemented in a high level language. Each file is processed by the compiler 12 into an object file 13, which typically comprises of a sequence of machine instructions that are the result of translating the high level source statements in the source file. These object files are then processed by a linker program 14, which combines the different object files and produces an executable program 16. The executable program is then generally ready for direct execution on a computer 17. Generally, program 16 reads input 15, processes data from input 15, and generates program output.

Figure 2:
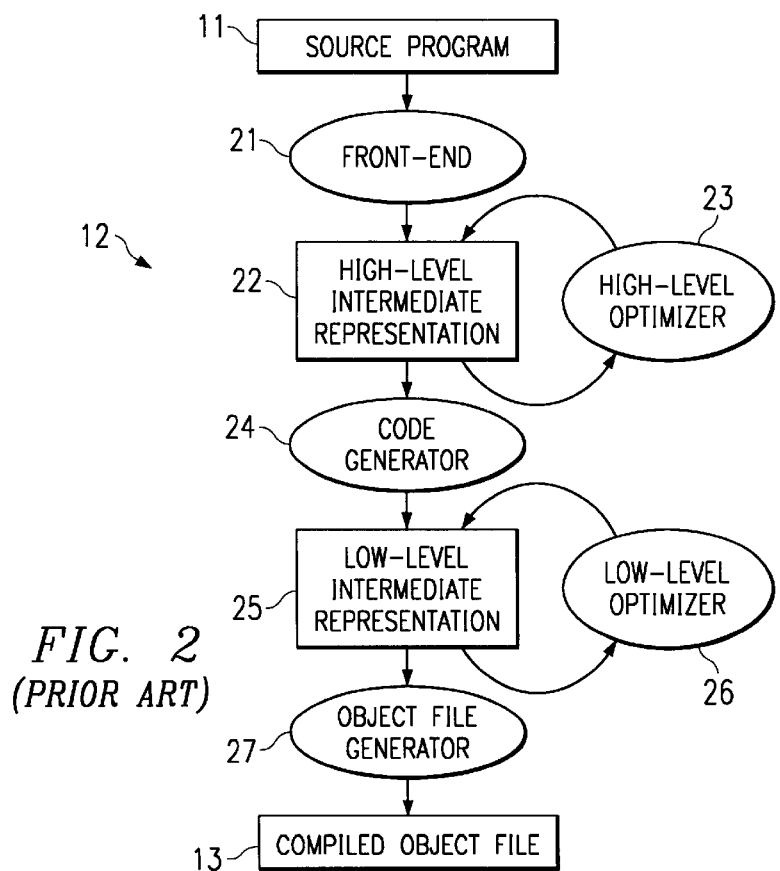
FIG. 2 depicts the internal structure of a prior art compiler.

FIG. 2 depicts the internal structure of optimizing version of the compiler 12 of FIG. 1. This type of compiler not only translates source files into object files 23, but also attempts to improve the run-time performance of the object file created. The compiler begins with the source file 11. The source file is read in and checked for syntax errors or semantic errors by a component of the compiler known as the front end 21. If there are no errors, compilation generally proceeds with the front end 21 generating a high level intermediate representation 22. This representation is an internal abbreviated description of the source file that in many optimizing compilers, is digested optionally by a high level optimizer 23 that attempts to improve the structure of that high level intermediate representation and thereby increase run-time performance.

Generally, the high level optimizer generally performs transformations that would allow the code to be executed faster when the code is subsequently processed by other downstream phases of the compiler. The high level intermediate representation is generally converted into a low level intermediate representation 25 that is much closer to the sequence of instructions that a computer would actually be able to execute. The conversion process is generally carried out by a code generator 24. The low level intermediate representation is optionally subject to optimization by a low level optimizer 26 and once that is done, the final step involves generating the object file 13, which is typically done by the very back end of the compiler or object file generator 27.

Figure 3:
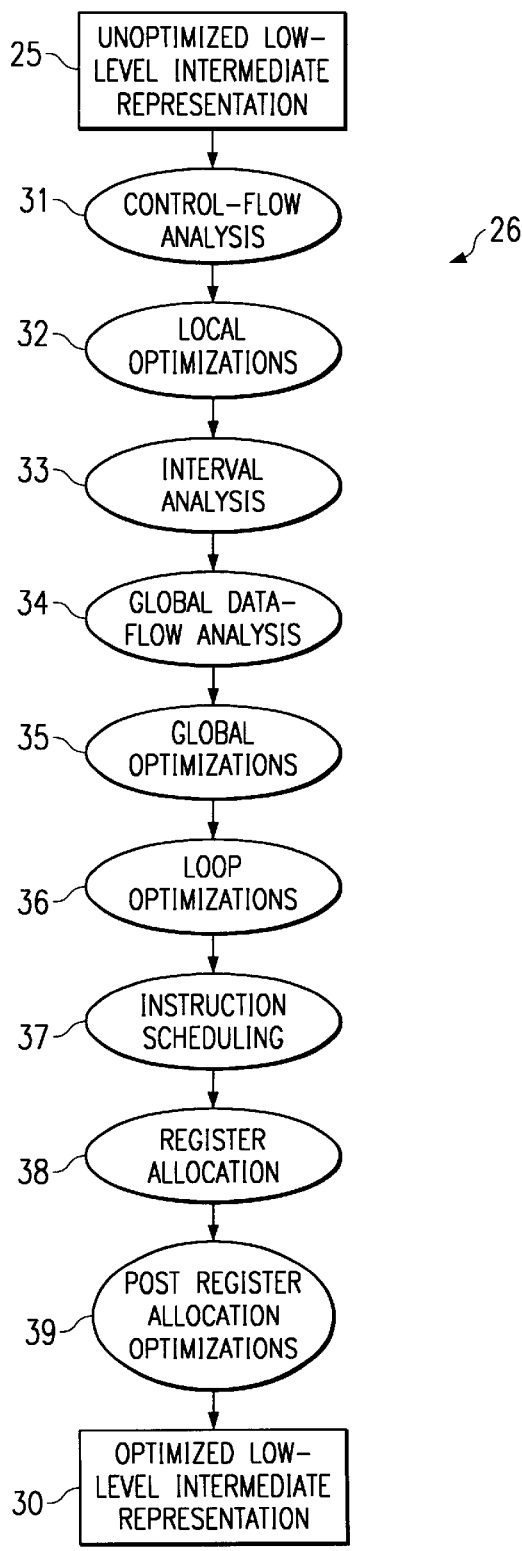
FIG. 3 depicts one available internal structure of the low level optimizer of FIG. 2.

FIG. 3 depicts the internal structure of a typical low level optimizer 26 shown in FIG. 2. The optimizer begins with the unoptimized low level intermediate representation 25 for each procedure being compiled and generates the optimized low level intermediate representation 30 for each procedure. Generally, the main phases that comprise the low level optimizer are shown in FIG. 3. The first phase is the control flow analysis phase 31, the task of which is to create a graph representation of the low level intermediate representation, where the nodes of the graph are referred to as basic blocks. These blocks are sequences of instructions or low level intermediate operations that are to be executed without a change in the control flow. The edges of the control flow graph generally correspond to possible transfers of control between the nodes, depending on conditional checks. For instance, an if statement in the program would correspond to a basic block that is terminated with control flow edges to the then clause and the else clause.

The second phase of the low level optimizer is generally the local optimization phase 32, which generally focuses on the individual nodes of the control flow graph, that is the individual basic blocks or stretches of instructions without intervening breaks in control flow. This is the scope of the local optimizer and the kinds of code transformations that are performed are simple things like recognizing duplicate computations and eliminating such redundancies. Another exemplary operation is that of constant propagation, wherein operations involving register values are replaced, where possible, with operations involving constant values.

The third phase is generally interval analysis 33, where the task is to recognize the loop structure of the procedure that is being compiled. For example, where a program contains a loop, the interval analysis phase 33 would recognize that there is a repetitive control flow structure that may involve multiple basic blocks, which constitute a loop.

Generally, the fourth phase is global data flow analysis 34, which determines how data values that are computed in the different basic blocks flow from one basic block to the other when a procedure operates globally. So for instance, if the numerical value "10" is computed and assigned to a variable i in basic block 1, the analysis determines whether the value assigned to the variable i propagates onto other basic blocks downstream from basic block 1 in the control flow graph. This phase also determines how data is transmitted through the different edges in the control flow graph. That is critical for many global optimization phases 35. Most global optimization phases rely on preceding global data flow analysis, and in the global optimization phase several classic optimizations take place, such as global constant propagation or global common sub-expression elimination.

The sixth phase is the loop optimizations 36. These optimizations are generally focused on improving the performance of loops. That is, instructions that are found within loop structures identified by the earlier interval analysis phase are transformed by the phase.

Phase 37 is a global instruction scheduling phase that reorders instructions to improve hardware pipeline efficiency as the program executes on the hardware. After that is a register allocation phase 38 that assigns physical registers to different virtual register resources in the program. For instance, if there is a variable i that is declared in a source level program, the register allocator may decide to maintain the variable i in register R20 and it may decide to maintain another variable j in register R15. Generally, the foregoing are typical decisions made by the register allocator. Register allocation is an important step in order to get a functional object file. Finally, the post register allocation optimization phase 39 includes sundry things like peephole optimizations and local instruction scheduling. The optimizing operations of the present invention, register renaming, and load speculation, are performed within phase 37.

In a preferred embodiment of the present invention, two different optimizing operations are performed: register renaming, and instruction speculation. The determination as to whether either operation is beneficial to program execution is preferably conducted in two phases. Phase one preferably performs an initial set of tests on the instruction and, if the results are favorable, will provisionally perform the optimizing operation, while preserving information about the initial condition of the program in case the operation is later reversed. Phase two will leave the optimizing operation intact where it finds the operation actually beneficial to the program, and will reverse the operation using the information preserved in phase one if the operation is found not to be beneficial.

In a preferred embodiment, phase one of the mechanism's operation involves performing dependency analysis on the instruction stream. This analysis permits the mechanism to determine if performance of an optimizing operation, either register renaming or instruction speculation, may be beneficial. At any given time, the optimizer's analysis is limited to some set of instructions, called the instruction window. This set of instructions may be a basic block, superblock, trace, procedure, or some other set of instructions, depending on the design of the optimizer.

In a preferred embodiment, phase one of the inventive optimizer uses the following two criteria to decide whether to rename or speculate: first, the target of the instruction is used later in the instruction window than the instruction being optimized, and second, the rename or speculation operation reduces the upward path length of the instruction.

In a preferred embodiment, the first criterion in phase one is satisfied when the target of the instruction being optimized be located later in the instruction stream than the instruction under consideration for optimization. The "target" referred to above is an instruction which uses information generated in the instruction being optimized, or which otherwise depends upon the operation of this instruction. While the target should succeed the instruction being optimized, it should still be within the instruction window, which may be of many possible sizes, as described above. If the target of the instruction under consideration is outside the instruction window, it will generally not increase execution latency at run-time, and optimization is therefore generally unnecessary.

In a preferred embodiment, the second criterion in phase one is satisfied when the optimizing operation reduces the upward path of the instruction. In other words, performing the rename or speculation should preferably allow the optimizer to move the instruction to a earlier point in the instruction stream.

In a preferred embodiment, the ability to move an instruction so that it executes earlier in the instruction stream depends upon the dependency relationships of that instruction. As the mechanism scans through the instruction stream, it preferably constructs a dependency graph indicating the relationship of the instructions to one another. Whenever a dependency exists between two instructions, the mechanism assigns an upward path length to the dependent instruction which is equal to the upward path length of the parent instruction added to the length of the dependency. For each instruction, the mechanism preferably performs the optimizing operation under consideration only if doing so would reduce that instruction's upward path length.

Figure 4:
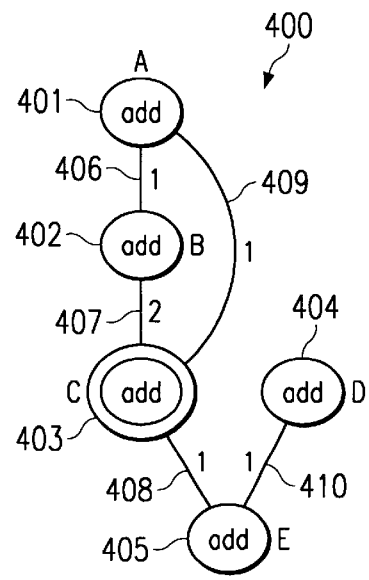
FIG. 4 depicts a path length diagram for a sample set of programming nodes according a preferred embodiment of the present invention.

FIG. 4 depicts an example of path flow analysis. Node A 401 has a downward flow path of 4 since, in order to reach node E 405, execution requires one step 406 to reach node B 402, two steps 407 to reach node C 403, and one more step 408 to reach E 405. Although node A 401 is also connected to node C 403 by a shorter path 409, the downward path length of 4 between A 401 and E 405 remains valid because the longest path generally governs. Node D 404 has a downward path length of one, because only one step 410 is required to reach node E 405. Node D 404 has an upward path length of zero.

In a preferred embodiment, satisfaction of the two criteria discussed above is necessary, but not sufficient, for the rename or speculation operation to be actually beneficial to the program. In the dependency analysis phase, the optimizer preferably provisionally performs any renames or speculations which were apparently beneficial based on the two stated criteria. In the second phase of the optimizer, the instruction scheduler preferably removes any renames or speculations that were not actually beneficial to program performance.

In a preferred embodiment, in order to determine whether an optimizing operation is actually beneficial in phase two, the mechanism should determine the instruction's downward path length. The downward path length is generally the path length from the instruction to a leaf, or branch operation, in the dependency analysis graph. The various possible paths between the instruction and the branch can only be determined once the entire dependency graph has been constructed. Generally, it is the longest of these paths which governs and thereby establishes the downward path length.

In a preferred embodiment, the mechanism uses an instruction's critical point to compute whether a rename or speculation will be actually beneficial. Generally, the critical point of an instruction is the latest point in the instruction flow at which the instruction can be scheduled without increasing the number of steps to be executed in order to schedule all the instructions in the instruction window. In other words, it is generally the latest point at which the instruction can be scheduled without impacting the critical path of the instruction window.

In a preferred embodiment, the mechanism determines whether the rename or speculation was actually beneficial by delaying the rename or speculation until either the original instruction can be scheduled without the rename or speculation, or the instruction's critical point is reached. Generally, the instruction may be scheduled without the rename or speculation, prior to the critical point, when all the dependencies of the register copy or speculation check associated with the instruction have been satisfied other than the dependency due to the instruction itself. An instruction which is scheduled prior to the critical point in the manner described above is referred to herein as being "safely rescheduled." Generally, a speculation check is an operation which checks the validity of a speculated instruction.

In a preferred embodiment, if the mechanism has reached the critical point for an instruction, and there has not been occasion to reschedule the instruction in unoptimized form, the mechanism preferably concludes that the optimizing operation is actually beneficial to program performance. Accordingly, in this situation, the mechanism will preferably preserve the optimizing operation performed in phase one.

In a preferred embodiment, if the mechanism is able to schedule the register copy or speculation check instruction prior to the critical point, the optimizing operation performed in phase one is undone using information stored by the inventive mechanism. Generally, there may be a complication associated with removing renames in phase two which does not apply to speculation operations. The rename may mask an antidependence, also called Write After Read (WAR) dependence. When the rename is removed, this dependence is reintroduced. The scheduler should respect this dependence when scheduling subsequent instructions. The following example illustrates the problem.

Figure 5:
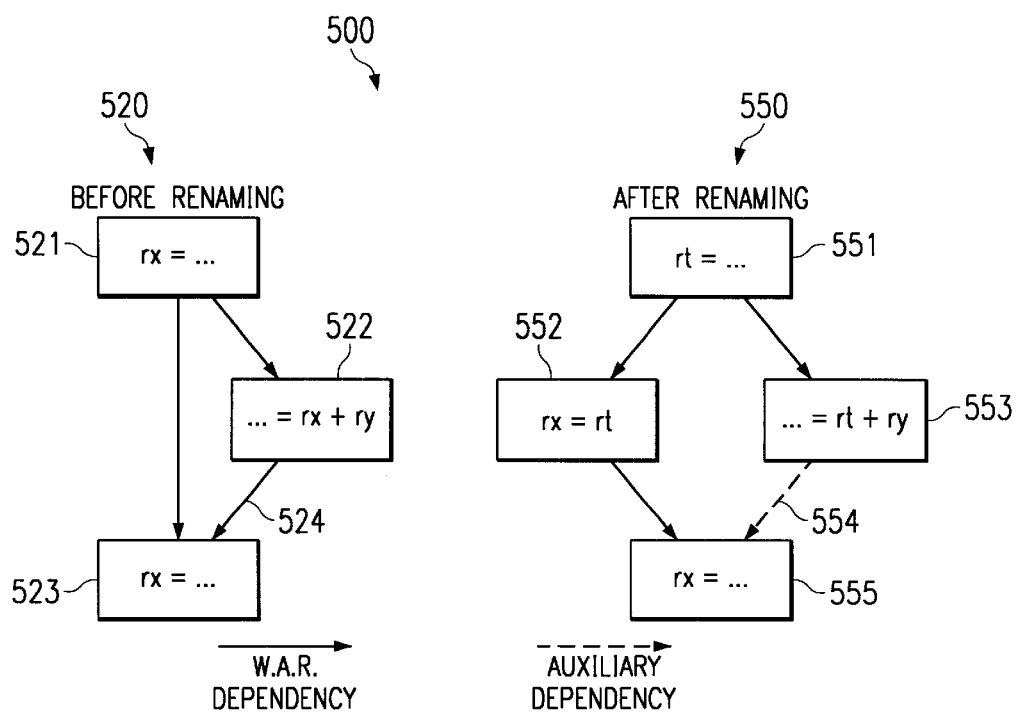
FIG. 5 depicts dependency charts for a section of code both before and after performance of a renaming operation according to a preferred embodiment of the present invention.

FIG. 5 depicts dependency charts for a sample section of code both before and after performance of a renaming operation according to a preferred embodiment of the present invention. A sequence of instructions before renaming 520 and after renaming 550 is considered. The variable rx, first defined at step 521 is renamed to rt at step 551. After the first definition of rt 551, the value of rt is preserved in rx 552.

In an alternate path, the first definition of rt 551 is followed by a use of rt 553, followed by another definition of rx 555. In the code with the rename, there is preferably no dependency from the use of rt 553 to the second definition of rx 555.

Generally, when the rename operation is undone, the variable rt is preferably renamed back to rx 522. Now there is a WAR dependency 524 from the use of rx 522 to the second definition 523. The optimizer should reintroduce this dependence, or the optimized code may produce incorrect results. However, the dependency graph generally does not contain enough information to do this at the time the rename operation is reversed.

In a preferred embodiment, this problem is addressed in the inventive mechanism by introducing the concept of an auxiliary dependency. The dependency analysis phase preferably constructs an auxiliary dependency 554 from a use of any renamed register to a later definition of the register that corresponds to the renamed register such as, for example, from a use of rt 553 to a definition of rx 555. Unlike other dependencies, auxiliary dependencies generally do not constrain the order in which the instruction scheduler can place instructions. However, whenever a rename is removed, any auxiliary dependency involving the renamed register is converted to an antidependency. The auxiliary dependency represents the antidependency that would have existed if the rename had not been performed.

Generally, in order for this solution to be correct, the mechanism should be able to ensure that when an auxiliary dependency is converted to an antidependency, the dependent instruction has not already been scheduled. The mechanism is preferably able to provide such assurance based on the existence of an output dependency (WAW dependency) between the first definition of rx 521 and the second definition of rx 523. Generally, this means that the second definition of rx cannot be scheduled until all previous definitions of rx have been scheduled. The mechanism thereby preferably resolves the issue of a possibly masked antidependency and permits the renaming process to proceed unhindered.

Figure 6:
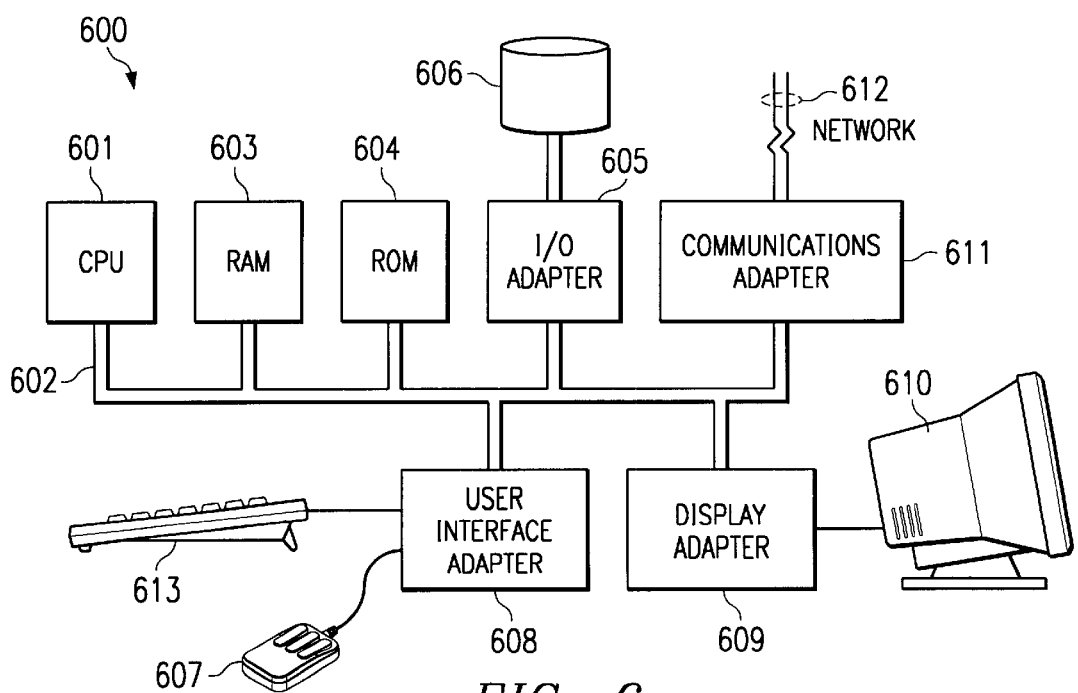
FIG. 6 depicts a computer mechanism on which a preferred embodiment of the present invention may be employed.

FIG. 6 depicts a computer mechanism 600 adapted to use the present invention. Central processing unit (CPU) 601 is coupled to bus 602. In addition, bus 602 is coupled to random access memory (RAM) 603, read only memory (ROM) 604, input/output (I/O) adapter 605, communications adapter 611, user interface adapter 608, and display adapter 609.

RAM 603 and ROM 604 hold user and mechanism data and programs as is well known in the art. I/O adapter 605 connects storage devices, such as hard drive 606 or CD ROM (not shown), to the computer mechanism. Communications adaptor 611 couples the computer mechanism to a local, wide-area, or Internet network 612. User interface adapter 608 couples user input devices, such as keyboard 613 and pointing device 607, to the computer mechanism 600. Finally, display adapter 609 is driven by CPU 601 to control the display on display device 610. CPU 601 may be any general purpose CPU, such as a HP PA-8200. However, the present invention is not restricted by the architecture of CPU 601 as long as CPU 601 supports the inventive operations as described herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for optimizing program performance in an optimizer, the method comprising the steps of:
    qualifying selected ones of instructions in an instruction stream for optimization, thereby generating qualified instructions;
    provisionally performing optimizing operations on said qualified instructions, thereby creating provisionally optimized instructions;
    reversing said optimizing operations on said provisionally optimized instruction for ones of said optimized instructions which can be safely rescheduled, thereby generating de-optimized instructions; and
    preserving said optimizing operations, performed in said step of provisionally performing, on provisionally optimized instructions which could not be scheduled prior to a critical point for said provisionally optimized instructions.

2. The method of claim 1 wherein the step of qualifying comprises:
    determining that an optimization operation contemplated for an instruction reduces an upward path length of said instruction.

3. The method of claim 2 wherein the step of qualifying further comprises:

establishing that a target of said instruction is located later in said instruction stream than said instruction.

4. The method of claim 1 wherein the step of provisionally performing optimizing operations comprises:

renaming a register.

5. The method of claim 4 comprising the further steps of:

establishing auxiliary dependency of an instruction comprising a definition of a first register on a most recent instruction using a register to which said first register has been renamed in a renaming operation; and converting said auxiliary dependency into a Write-After-Read dependency if the renaming operation is reversed.

6. The method of claim 1 wherein the step of provisionally performing optimizing operations comprises:

speculating an instruction.

7. The method of claim 6 wherein the step of speculating comprises:

speculating a memory read operation.

8. The method of claim 6 wherein the step of speculating comprises:

speculating a memory write operation.

9. The method of claim 1 comprising the further step of:

rescheduling said de-optimized instructions without extending a critical path of program execution.

10. A computer program product having a computer readable medium having computer program logic recorded thereon optimizing program performance in an optimizer, the computer program product further comprising:

code for qualifying selected ones of instructions in an instruction stream for optimization, thereby generating qualified instructions;

code for provisionally performing optimizing operations on said qualified instructions, thereby creating provisionally optimized instructions;

code for reversing said optimizing operations on said provisionally optimized instruction for ones of said optimized instructions which can be safely rescheduled, thereby generating de-optimized instructions; and code for preserving said optimizing operations, performed in said step of provisionally performing, on provisionally optimized instructions which could not be scheduled prior to a critical point for said provisionally optimized instructions.

11. The computer program product of claim 10 wherein the code for qualifying comprises:

code for determining that an optimization operation contemplated for an instruction reduces an upward path length of said instruction.

12. The computer program product of claim 11 wherein the code for qualifying further comprises:

code for establishing that a target of said instruction is located later in said instruction stream than said instruction.

13. The computer program product of claim 10 wherein the code for provisionally performing optimizing operations comprises:

code for renaming a register.

14. The computer program product of claim 13 further comprising:

code for establishing auxiliary dependency of an instruction comprising a definition of a first register on a most recent instruction using a register to which said first register has been renamed in a renaming operation; and code for converting said auxiliary dependency into a Write-After-Read dependency if the renaming operation is reversed.

15. The computer program product of claim 10 wherein the code for provisionally performing optimizing operations comprises:

code for speculating an instruction.

16. The computer program product of claim 10 further comprising:

code for rescheduling said de-optimized instructions without extending a critical path of program execution.

17. A method for optimizing program performance in an optimizer, the method comprising the steps of:

qualifying selected ones of instructions in an instruction stream for optimization, thereby generating qualified instructions;

provisionally performing optimizing operations on said qualified instructions, thereby creating provisionally optimized instructions, wherein said provisionally performing optimizing operations comprises renaming a register;

establishing auxiliary dependency of an instruction comprising a definition of a first register on a most recent instruction using a register to which said first register has been renamed in a renaming operation;

reversing said optimizing operations on said provisionally optimized instruction for ones of said optimized instructions which can be safely rescheduled, thereby generating de-optimized instructions; and converting said auxiliary dependency into a Write-After-Read dependency if the renaming operation is reversed.

18. A method for optimizing program performance in an optimizer, the method comprising the steps of:

qualifying selected ones of instructions in an instruction stream for optimization, thereby generating qualified instructions, wherein an instruction has a critical point beyond which scheduling said instruction would lengthen a critical path of program execution;

provisionally performing optimizing operations on said qualified instructions, thereby creating provisionally optimized instructions;

determining whether said program execution critical path is lengthened by rescheduling said instruction;

delaying, if said step of determining indicates that said step of rescheduling will lengthen said program execution critical path, the scheduling of said instruction until one of following conditions is satisfied: the instruction may be rescheduled in unoptimized form; and said critical point of said instruction is reached; and reversing said optimizing operations on said provisionally optimized instruction for ones of said optimized instructions which can be safely rescheduled, thereby generating de-optimized instructions.

19. A computer program product having a computer readable medium having computer program logic recorded thereon optimizing program performance in an optimizer, the computer program product further comprising:

code for qualifying selected ones of instructions in an instruction stream for optimization, thereby generating qualified instructions;

code for provisionally performing optimizing operations on said qualified instructions, thereby creating provisionally optimized instructions, wherein said code for provisionally optimizing operations comprises code for renaming a register;

code for establishing auxiliary dependency of an instruction comprising a definition of a first register on a most recent instruction using a register to which said first register has been renamed in a renaming operation;

code for reversing said optimizing operations on said provisionally optimized instruction for ones of said optimized instructions which can be safely rescheduled, thereby generating de-optimized instructions; and code for converting said auxiliary dependency into a Write-After-Read dependency if the renaming operation is reversed.

20. A computer program product having a computer readable medium having computer program logic recorded thereon optimizing program performance in an optimizer, the computer program product further comprising:

code for qualifying selected ones of instructions in an instruction stream for optimization, thereby generating qualified instructions, wherein an instruction has a critical point beyond which scheduling said instruction would lengthen a critical path of program execution;

code for provisionally performing optimizing operations on said qualified instructions, thereby creating provisionally optimized instructions;

code for determining whether said program execution critical path is lengthened by rescheduling said instruction;

code for delaying, if said step of determining indicates that said step of rescheduling will lengthen said program execution critical path, the scheduling of said instruction until one of following conditions is satisfied: the instruction may be rescheduled in unoptimized form; and said critical point of said instruction is reached; and code for reversing said optimizing operations on said provisionally optimized instruction for ones of said optimized instructions which can be safely rescheduled, thereby generating de-optimized instructions.

* * * * *